UNITED STATES PATENT OFFICE 2,661,272

1-CYCLOHEXYL-3,3-DIALKYLUREAS AND THEIR USE AS HERBICIDES

Norman E. Searle, Wilmington, Del., assignor to E. I. du Pont de Nemours and Company, Wilmington, Del., a corporation of Delaware No Drawing. Application September 21, 1950,
Serial No. 186,116

10 Claims. (Cl. 71—2.3)

This invention relates to a new class of amido compounds and to novel herbicidal compositions. More particularly it relates to a new class of N-cyclohexyl ureas and to herbicidal compositions containing N-cycloaliphatic urea compounds.

The enormous economic losses caused by weeds have, to some extent, been relieved in recent years with the advent of 2,4-dichlorophenoxyacetic acid (2,4-D), trichloroacetic acid and related synthetic chemicals. These products, however, have not been particularly successful in the control of certain weeds such as Johnson grass, Bermuda grass, nut grass, quack grass and the like. Effective herbicidal materials for the control of these and other plants resistant to the presently available products are much needed.

It is an object of this invention to provide a new class of N-cyclohexyl ureas and methods for their preparation. A further object is to provide herbicidal compositions containing N-cycloaliphatic urea compounds as an essential active ingredient. Other objects will appear hereinafter.

The objects of this invention are accomplished by providing new 1-cyclohexyl-3,3-dialkyl ureas and novel herbicidal compositions containing as an essential active ingredient a compound having the formula

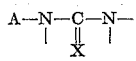

wherein A is a monovalent cycloaliphatic hydrocarbon radical, X is a doubly bonded chalcogen of atomic number less than 17, from one to three of the nitrogen valence bonds are singly attached to monovalent aliphatic acyclic hydrocarbon radicals through a saturated carbon atom thereof, and any remaining nitrogen valence bonds are directly attached to hydrogen.

It has now been discovered that broad leafed and grass weeds can be successfully controlled by the new herbicidal compositions of this invention containing as essential active ingredients N-cycloaliphatic urea compounds in which the 2-carbon atom of the urea linkage,

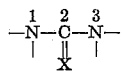

is doubly bonded to a chalcogen, X, of atomic number less than 17, i. e., oxygen and sulfur, and having directly attached to the urea nitrogen atoms one monovalent cycloaliphatic, preferably saturated, hydrocarbon radical, and, through saturated carbon, (n-1) aliphatic acyclic mono-valent hydrocarbon, i. e., alkyl and alkenyl, radicals, n being an integer less than 5. These urea compounds are of the formula

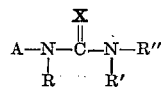

wherein A is the cycloaliphatic hydrocarbon group, X is the defined chalcogen, and the R groups are hydrogen, alkyl and alkenyl.

Of this group a new class of oxygen ureas, i. e., the chalcogen, X, is oxygen only, having hydrogen on the urea nitrogen which is nuclearly bonded to a cyclohexyl radical and two alkyl radicals of up to eight carbon atoms on the other urea nitrogen atom is provided by this invention. This new class can be represented by the general formula,

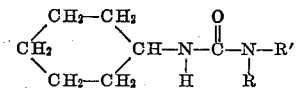

wherein R and R' are alkyl radicals, preferably of from 1 to 8 carbon atoms.

The ureas of this invention can be prepared by conventional methods, for example, by reaction of aliphatic primary and secondary amines and in certain cases their salts, e. g., mineral acid salts, with an isocyanate, isothiocyanate, carbamyl chloride or thiocarbamyl chloride. The following equations illustrate more specifically these various methods which can be suitably employed for the preparation of representative ureas embraced in this invention:

*Method A*

(1)

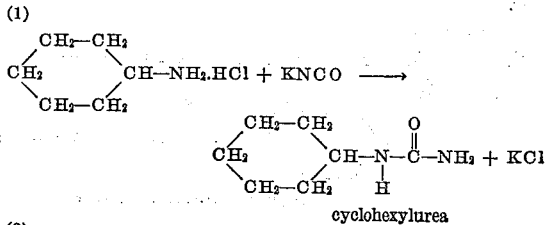

cyclohexylurea (2)

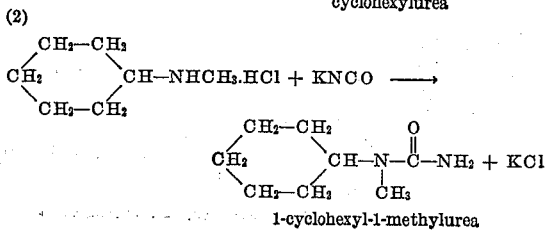

1-cyclohexyl-1-methylurea (3)
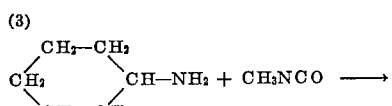
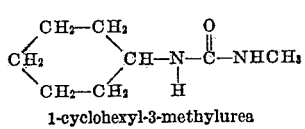
1-cyclohexyl-3-methylurea (4)
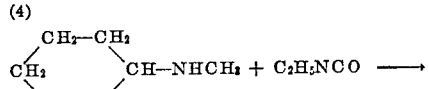
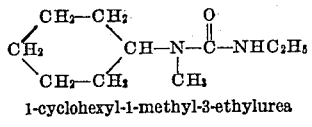
1-cyclohexyl-1-methyl-3-ethylurea (5)
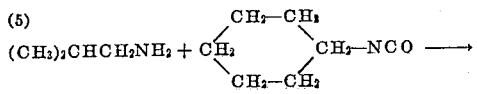
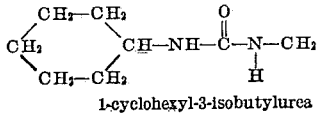
1-cyclohexyl-3-isobutylurea (6)
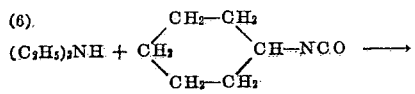
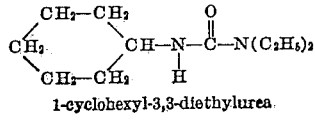
1-cyclohexyl-3,3-diethylurea

Method B (1)
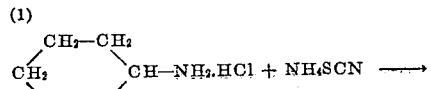
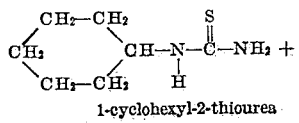
1-cyclohexyl-2-thiourea (2)
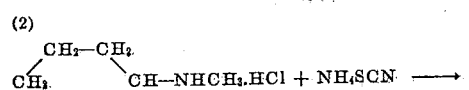
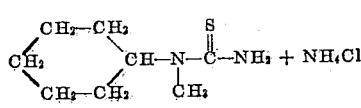
1-cyclohexyl-2-thio-1-methylurea (3)
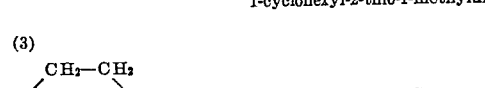
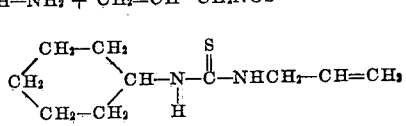
1-cyclohexyl-2-thio-3-allylurea (4)
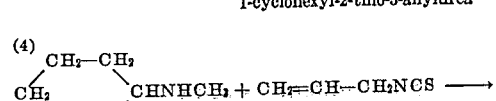
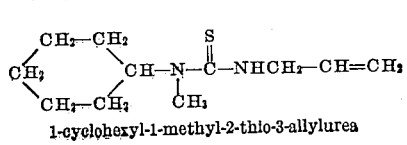
1-cyclohexyl-1-methyl-2-thio-3-allylurea (5)
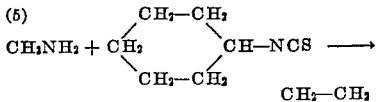
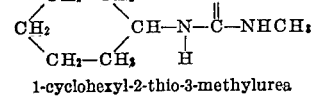
1-cyclohexyl-2-thio-3-methylurea (6)
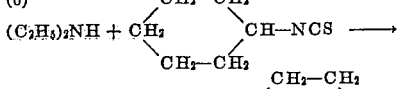
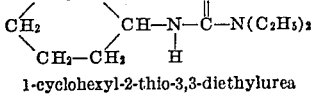
1-cyclohexyl-2-thio-3,3-diethylurea

Method C (1)
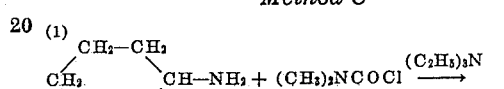
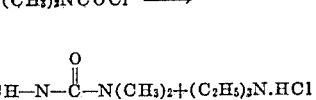
1-cyclohexyl-3,3-dimethylurea (2)
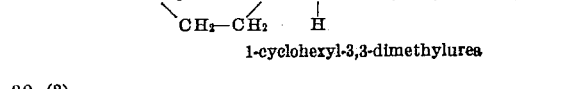
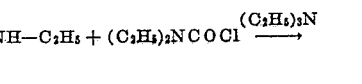
1-cyclohexyl-1,3,3-triethylurea

Method D (1)
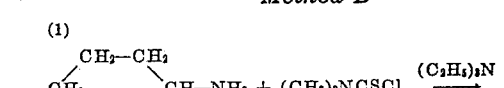
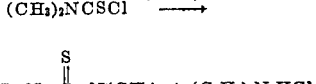
1-cyclohexyl-2-thio-3,3-dimethylurea (2)
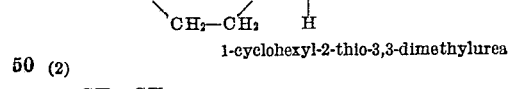
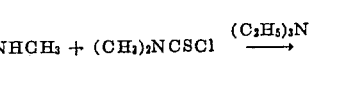
1-cyclohexyl-2-thio-1,3,3-trimethylurea The above reactions are accomplished by bringing the amine or, in cases indicated, their salts in contact with one of the reactants specified, usually in chemically equivalent amounts, and, if necessary, heating to reaction temperature. A suitable procedure consists in slowly adding at a temperature of 0 to 100° C., preferably 15–75° C., the organic isocyanate, isothiocyanate, carbamyl chloride, or thiocarbamyl chloride to the selected amine, preferably employed in molar excess, e. g., 10–20%, dissolved or suspended in an inert liquid medium such as dry dioxane, dry benzene, dry dibutyl ether, dry toluene and the like, and continuing the reaction until completed. Ordinarily this does not require more than two to three hours after the reactants have been thoroughly mixed, e. g., by stirring, at the specified temperature.

The isocyanate, carbamyl chloride, or thiocarbamyl chloride can also be dissolved or suspended in inert liquid media similar to those employed with the amine. Two to twenty parts of inert liquid reaction medium, i. e., diluent, to each part of amine or other specified reactant will ordinarily be satisfactory.

When employing an inorganic isocyanate or thiocyanate with an amine salt in accordance with Methods A (1,2) and B (1,2), water is a most suitable liquid reaction medium. It is of advantage when carrying out reaction with the carbamyl or thiocarbamyl chlorides (Methods C and D) to use an acid acceptor, e. g., a tertiary amine such as triethylamine, dimethylaniline, pyridine, etc., ordinarily dissolved or suspended in inert diluent with the amine. Generally, it is desirable to carry out the first part of the reaction at moderate temperature, e. g., 15–35° C., and then slowly increase the temperature, if necessary, to complete the reaction.

The new 1-cyclohexyl-3,3-dialkylureas are, for the most part, solids and can be isolated by crystallization, extraction or other suitable means. For example, when dioxane or other inert water-miscible reaction medium is employed, the new solid 1-cyclohexyl-3,3-dialkylureas of a satisfactory degree of purity can usually be isolated by cooling or diluting the reaction mixture with water and removing the precipitated urea by filtration. If desired further purification can be achieved through crystallization, in most instances from dioxane or benzene, or a mixture of these solvents.

The ureas defined herein can be incorporated with various materials to prepare the new herbicidal compositions of the invention either in liquid or solid form. For example, solutions of the ureas in organic solvents such as cyclohexanol, furfural, isobutanol, isopropyl acetate and the like, can be applied directly as herbicides. This method of application, however, is uneconomical and generally impractical. Suitable compositions are prepared by admixing or dispensing the ureas with a non-solvent carrier which may be either solid or liquid. Thus herbicidal dust compositions are compounded to give homogeneous free-flowing dusts by admixing the ureas with finely divided solids, preferably talcs, natural clays, prophyllite, diatomaceous earth, and flours such as walnut shell, wheat, redwood, soya bean and cottonseed flours. Other inert solid carriers which can be used to prepare the herbicidal compositions include magnesium and calcium carbonates, calcium phosphate, sulfur, lime, etc. either in powder or granular form. The percentage by weight of the essential active ingredient will vary according to the manner in which the composition is to be applied to the plants, but in general will be 0.5 to 95% by weight of the herbicidal composition.

Liquid herbicidal compositions consist for example of the ureas homogeneously dispersed in water or other non-solvent carrier. To secure such homogeneous dispersions a surface-active agent is used. In fact, the preferred herbicidal compositions of this invention, whether in liquid or in solid form contain the ureas homogeneously admixed with a surface-active agent, sometimes referred to in the art as wetting, dispersing, or penetrating agents. These agents cause the compositions to be easily dispersed in water to give aqueous sprays which, for the most part, constitute a most desirable method of application.

The surface-active agents employed can be of the anionic, cationic or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salts of lignin sulfonic acid (goulac), alkylnaphthalene sodium sulfonate, sodium salts of sulfonated condensation products of naphthalene and formaldehyde, sodium lauryl sulfate, disodium monolauryl phosphates, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate, of polyamines from reductive amination of ethylene/carbon monoxide polymers, laurylamine hydrochloride, laurylpyridinium bromide, stearyltrimethylammonium bromide, cetyldimethylbenzylammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions of the invention can also have incorporated therein oils, fats or similar vehicles such as, cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

Concentrated water-dispersible liquid compositions can be prepared by incorporating with the ureas and surface-active agents various organic liquids such as furfural, methanol, isopropanol, isobutanol, xylol, cyclohexanol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active agent to urea can be 0.1 to 100% by weight in these water-dispersible herbicidal compositions.

In another method of application for weed control, the ureas of this invention are incorporated with fertilizers to form either powdery or granular herbicidal compositions that can be used in the cultivation of agricultural crops.

A more detailed practice of the invention is illustrated by the following typical examples, in which parts, unless otherwise specified, are by weight:

*Example I*

Dry hydrogen chloride was introduced into a solution of 99.2 parts of cyclohexylamine in 1000 parts of dry dioxane until the gas was no longer absorbed. A suspension of the cyclohexylamine hydrochloride had formed. Phosgene was then passed into the stirred suspension of amine salt while heating at 80–90° C. and until a clear solution resulted. Excess phosgene and hydrogen chloride were removed by distilling 450 parts of the dioxane with the pot temperature at 90–104° C.

Into one-half of this solution of cyclohexyl isocyanate was passed dimethylene while maintaining the reaction temperature at about 45° C. by external cooling. After absorption of the dimethylamine was completed, the reaction was heated at 45–50° C. for 30 minutes and then cooled to 25° C. The 1-cyclohexyl-3,3-dimethylurea was then precipitated from the reaction mixture with water and filtered, washed with cold water and dried in a vacuum desiccator over phosphorous pentoxide. The resulting snow-white needles of 1-cyclohexyl-3,3-dimethylurea amounted to 47 parts and melted at 157.2–158° C. It is soluble in hot water and alkylated naphthalene (Velsicol AR–50) solvent to the extent of about five percent.

Anal. calc'd. for $C_9H_{18}N_2O$: N, 16.45%; Found: N, 16.58%.

Other dialkyl amines which can be converted to the corresponding 1-cyclohexyl-3,3-dialkylureas by substituting in the molar proportions specified for the dimethylamine in the above example include the diethyl, dipropyl, dibutyl, diamyl, dihexyl, diheptyl, dioctyl, methyl isobutyl, methyl ethyl, ethyl isopropyl amines and the like. Thus, for example, 1-cyclohexyl-3,3-diethylurea; 1-cyclohexyl-3,3-dibutylurea; 1-cyclohexyl-3,3-dioctylurea; and 1-cyclohexyl-3-methyl-3-ethylurea can be obtained by proper choice from the foregoing dialkylamines named.

Example II

A one per cent acetone solution of 1-cyclohexyl-3,3-dimethylurea sprayed on Johnson grass seedlings resulted in substantially complete kill of this resistant plant.

Example III

A liquid composition was prepared by thoroughly admixing 0.2 part of 1-cyclohexyl-3,3-dimethylurea, 0.8 part of morpholine oleate, and 2 parts of a 50:50 mixture of isopropanol and alkylated naphthalene (Velsicol AR–50). This composition is readily dispersible in water and provides an aqueous spray composition suitable for herbicidal application.

Example IV

Twenty (20) parts of 1-cyclohexyl-3,3-dimethylurea is homogeneously blended with 80 parts of talc by placing in a micropulverizer mill and pulverizing the mixture until a particle size of about 50 microns is attained. This product provides a homogeneous free-flowing powder suitable for application as a herbicide.

Additional ureas which can be employed in the herbicidal compositions of this invention include 1-(1-menthyl)-3-allylurea, 1-(1-menthyl)-3-butylurea, 1-(1-menthyl)-3,3-diethylurea, 1-(menmethylurea, 1-cyclohexyl-2-thio-3,3-diethylurea, 1-cyclohexyl-2-thio-3-isopropylurea, 1-cyclohexylurea, 1-cyclohexyl-1-methylurea, 1-cyclohexyl-3-methylurea, 1-cyclohexyl-2-thio-3-allylurea, 1-cyclohexyl-2-thio-3-butylurea, 1-cyclohexyl-2-thio-3-ethylurea, and the like.

Although this invention embraces broadly ureas and thioureas having as substituents on the urea nitrogen atoms but one monovalent cycloaliphatic hydrocarbon radical and up to three aliphatic acyclic hydrocarbon, i. e., alkyl and alkenyl, radicals, the ureas wherein the chalcogen, X, in the previously described formula is oxygen are preferred over the corresponding sulfur analogs in view of somewhat higher herbicidal activity. Because of availability of preparative raw materials, the cycloaliphatic hydrocarbon group is preferably a saturated mononuclear cycloaliphatic group of six annular carbons. In preparing the herbicidal compositions of the invention the more desirable ureas are those having a hydrogen atom attached to the urea nitrogen bearing the nuclearly bonded cycloaliphatic hydrocarbon group and from one to two aliphatic acyclic hydrocarbon radicals on the other urea nitrogen atom, particularly alkyl radicals of up to two carbon atoms. For certain other uses, as in plasticizers and the like, the higher alkyl groups of up to eight carbon atoms in the new 1-cyclohexyl-3,3-dialkylureas are usually advantageous.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

The new 1-cyclohexyl-3,3-dialkylureas of this invention, in addition to their utility in herbicidal compositions, are also useful as conditioning agents for waxes, as modifiers for resins and plastics, and as chemical intermediates for the manufacture of pharmaceuticals.

As many apparently widely different embodiments of this invention may be made without departing from the spirit and scope thereof, it is to be understood that this invention is not limited to the specific embodiments thereof except as defined in the appended claims.

I claim:

1. A herbicidal composition comprising as an essential active ingredient homogeneously dispersed in a non-solvent fluent carrier, a compound having the formula

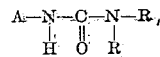

wherein A is cyclohexyl and R and R' are alkyl radicals.

2. A herbicidal composition comprising a surface-active agent and as an essential active ingredient in admixture therewith, a compound having the formula

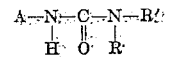

wherein A is cyclohexyl and R and R' are alkyl radicals.

3. A herbicidal composition comprising as an essential active ingredient homogeneously dispersed in a non-solvent fluent carrier with a surface-active agent, a compound having the formula

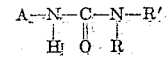

wherein A is cyclohexyl and R and R' are alkyl radicals.

4. A herbicidal composition comprising as an essential active ingredient homogeneously dispersed in a non-solvent fluent carrier, 1-cyclohexyl-3,3-dimethylurea.

5. A herbicidal composition comprising a surface-active agent and as an essential active ingredient in admixture therewith, 1-cyclohexyl-3,3-dimethylurea.

6. A herbicidal composition comprising as an essential active ingredient homogeneously dispersed in a non-solvent fluent carrier with a surface active agent, 1-cyclohexyl-3,3-dimethylurea.

7. A 1-cyclohexyl-3,3-dialkylurea having the formula

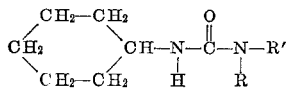

wherein R and R' are alkyl radicals.

8. The chemical compound, 1-cyclohexyl-3,3-dimethylurea.

9. A herbicidal method which comprises applying to a locus to be protected from weeds a composition containing a 1-cyclohexyl-3,3-dialkylurea as an essential herbicidal agent in effective amount.

10. A herbicidal method which comprises applying to a locus to be protected from weeds a composition containing 1-cyclohexyl-3,3-dimethylurea as an essential herbicidal agent in effective amount.

NORMAN E. SEARLE.

References Cited in the file of this patent

UNITED STATES PATENTS

| Number | Name | Date |
|---|---|---|
| 2,374,485 | Haury | Apr. 24, 1945 |
| 2,477,872 | Haury | Aug. 2, 1949 |

OTHER REFERENCES

Dieke et al., "J. Pharmacol," vol. 90 (1947), pages 260, 264.